Figure 1:
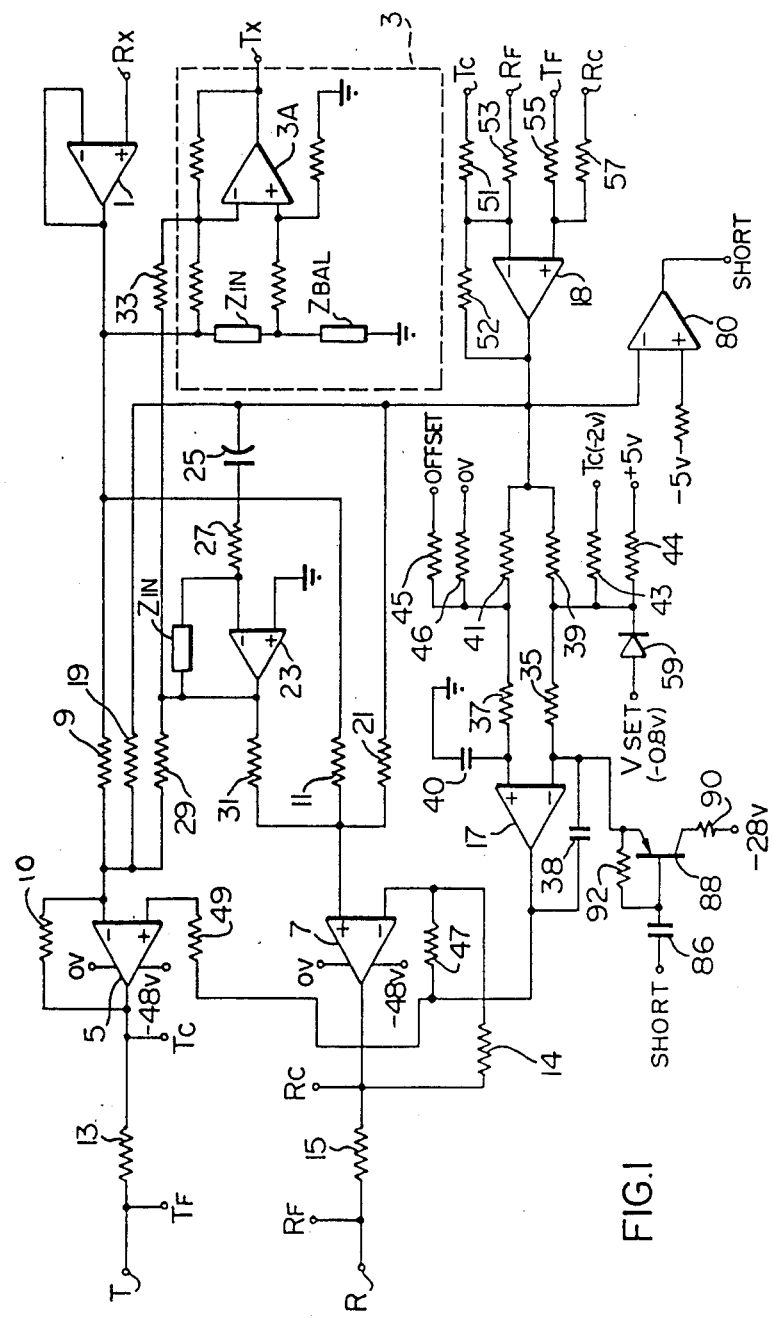

United States Patent [19]

Meier

[11] Patent Number: 4,800,586

[45] Date of Patent: Jan. 24, 1989

[54] COMPENSATION CIRCUIT FOR USE WITH AN INTEGRATING AMPLIFIER

[75] Inventor: Rolf Meier, Nepean, Canada

[73] Assignee: Mitel Corporation, Canada

[21] Appl. No.: 157,862

[22] Filed: Feb. 19, 1988

[30] Foreign Application Priority Data

Mar. 10, 1987 [CA] Canada .................................. 531660

[51] Int. Cl.⁴ ............................................. H04M 1/74
[52] U.S. Cl. ........................................ 379/399; 330/9
[58] Field of Search ................. 328/127, 128; 330/9, 330/51, 107; 379/345, 377, 395, 398, 400, 413, 399, 412

[56] References Cited

U.S. PATENT DOCUMENTS

| | | | |
|---|---|---|---|
| 3,885,760 | 5/1975 | Grimes et al. | 328/127 X |
| 4,527,014 | 7/1985 | Styrna | 379/388 |
| 4,532,381 | 7/1985 | Rosenbaum et al. | 379/345 |
| 4,563,547 | 1/1986 | Booth | 379/399 X |

Primary Examiner—Steven Mottola
Attorney, Agent, or Firm—Laff, Whitesel, Conte & Saret

[57] ABSTRACT

A compensation circuit for use with an integrating amplifier having an integrating capacitor connected between an input and output thereof. The integrating amplifier monitors an input signal and generates an integrated output signal in response thereto. The compensation circuit detects sudden variations in the input signal and in response momentarily discharge the integrating capacitor, thereby increasing responsiveness of the integrating amplifier in the event of sudden input signal variations.

5 Claims, 1 Drawing Sheet

COMPENSATION CIRCUIT FOR USE WITH AN INTEGRATING AMPLIFIER

This invention relates in general to integrating amplifiers and more particularly to a compensation circuit for use with an integrating amplifier in the DC control circuit of a constant current line circuit.

Integrating amplifiers are well known circuits which are useful in many applications which require generation or processing of analog signals. The integrating amplifier is typically comprised of a differential amplifier having an integrating capacitor connected between an inverting input and output thereof. The integrating amplifier performs the mathematical operation of integration and provides au output signal proportional to the integral of an input signal applied thereto.

One useful application of the integrating amplifier is in the DC control circuit of a constant current line circuit for maintaining a predetermined DC bias voltage level on a balanced telephone line.

Private automatic branch exchanges (PABXs) normally supply operating power to a balanced telephone line at typically −48 volts DC applied across tip and ring leads of the line. Solid state line circuits associated with the PABX apply AC signals differentially to the tip and ring leads via associated tip and ring differential driver circuits.

Normally, the tip lead is terminated at a remote central office by connection to a source of −48 volts DC while the ring lead is connected to ground. Thus, a low impedance load is connected across the tip and ring leads which normally draws a large amount of DC current, resulting in unwanted power dissipation through Joule heating, etc.

DC control circuits have been designed for reducing the current flowing through the tip and ring leads due to a low impedance load connected thereacross, by means of reducing the differential battery voltage applied to the tip and ring leads.

Negative feedback is established in the DC control circuit between the tip lead and an integrating amplifier, for comparing the monitored tip lead voltage with a predetermined offset voltage and generating a DC bias signal proportional to the difference therebetween. The bias signal is applied equally to the tip and ring differential driver circuits. Hence, the voltages on the tip and ring leads are maintained at a predetermined bias level offset from the nominal line voltages, for maintaining a constant current line feed and accommodating AC signals superimposed thereon.

However, in response to the remote central office switching from a battery and ground feed to a loop feed (i.e. a high (approximately 1 k ohm) impedance connected across tip and ring lead), the DC control circuit attempts to supply a higher tip and ring lead differential voltage in order to maintain constant current flow. Because of the settling time of the integrating amplifier, the line circuit is unable to respond quickly to such sudden increases in impedance. Thus, the PBX incorrectly detects that there is a break in the loop, resulting for instance in an erroneous detection of an extra digit pulse (i.e. approximately 100 msec. break in the loop).

According to the present invention, a compensation circuit is provided for use with an integrating amplifier, for detecting sudden variations in the input signal and in response momentarily discharging the integrating capacitor, thereby increasing responsiveness of the integrating amplifier in the event of such sudden input signal variations. Thus, a DC control circuit constructed in accordance with the present invention, provides correct biasing of the DC voltage on the tip and ring leads to maintain a constant current, regardless of sudden increases in impedance connected to the tip and ring line leads.

The circuit is straightforward and inexpensive, and may be advantageously fabricated ultilizing integrated circuit technology.

According to a preferred embodiment, a compensation circuit is provided for use in a constant current line circuit having tip and ring differential driver circuits for generating nominal tip and ring lead battery voltages, and a DC control circuit comprised of an integrating amplifier having an integrating capacitor connected thereacross, for monitoring DC voltages carried by the tip lead and in response generating a predetermined DC bias signal to each of the tip and ring lead driver circuits for maintaining constant DC feed current through the tip and ring leads. The compensation circuit detects sudden increases in impedance connected to the tip and ring leads and in response momentarily discharges the integrating capacitor, thereby increasing responsiveness of the DC control circuit in the event of, for example, the remote central office switching from a battery and ground feed to a loop feed.

A better understanding of the present invention will be obtained with reference to the detailed description below in conjunction with the following drawing, in which:

FIG. 1 is a schematic diagram of a telephone line circuit including a DC control circuit having compensation circuitry connected thereto, according to a preferred embodiment of the present invention.

As an example of a useful application of the compensation circuit according to the present invention, a constant current telephone line circuit will be described utilizing the inventive compensation circuit for controlling an integrating amplifier which forms part of a DC control circuit.

However, it will understood to a person skilled in the art that the compensation circuit of the present invention may be applied to many other circuits utilizing integrating amplifiers for monitoring input signals characterized by sudden changes or variations.

With reference to FIG. 1, receive and transmit circuits 1 and 3 are illustrated for receiving and transmitting audio signals to and from a communication system, such as a PABX, via $R_x$ and $T_x$ terminals thereof, respectively. The received signals are differentially applied to tip and ring terminals T and R, connected to a balanced telephone line via respective tip and ring differential driver circuits 5 and 7.

In particular, a signal received on the $R_x$ terminal is amplified via receive circuit 1, shown diagrammatically as a differential amplifier, and applied via equal valued resistors 9 and 11 to inverting and non-inverting inputs of driver circuits 5 and 7 respectively. The received signals are then differentially applied to the tip and ring terminals T and R, via equal valued output resistors 13 and 15, respectively.

Signals from a remote circuit, such as a subscriber set or trunk circuit, carried by the balanced line and appearing on the tip and ring terminals, T and R, are received and amplified via a further differential amplifier 18, and applied to an additional amplifier 23 via AC coupling capacitor 25 and input resistor 27. The received signals are amplified in amplifier 23, and applied to the transmit circuit 3 for reception by the PABX, via the $T_x$ terminal. Amplifier 23 has an AC input matching impedance $Z_{IN}$ connected thereto, for generating a nominal AC input impedance in a well known manner.

The transmit circuit 3 is shown diagrammatically as being comprised of a differential amplifier 3A, line balancing impedances $Z_{IN}$ and $Z_{BAL}$, as well as various gain adjusting resistors, all of which comprises a well known design.

A portion of the amplified signal from amplifier 18 is reapplied in aiding phase (i.e. via positive feedback), to the tip and ring leads via driver circuits 5 and 7, through equal valued resistors 19 and 21 respectively. The positive feedback of the received signals to the tip and ring leads serves to cancel the effect of output resistors 13 and 15 on the input impedance established by $Z_{IN}$. Resistors 13 and 15 and $Z_{IN}$ provide a nominal balanced line impedance, yet resistors 13 and 15 can be made of low resistance for providing a low resistance line current feed.

The signals output from amplifier 18 are also applied to inverting and non-inverting inputs of an amplifier 17 via equal valued resistors 35 and 37, and equal valued resistors 39 and 41, and are thus effectively cancelled.

A predetermined amount of AC and DC feedback is provided by feedback resistors 10 and 14 connected to driver circuits 5 and 7 respectively.

Considering the DC control aspect of the line circuit, a −48 volt DC battery voltage source is applied to the balanced line via driver circuits 5 and 7.

Amplifier 17 functions as a DC controller or integrator for monitoring the DC voltage appearing on the tip lead at the terminal $T_c$, via resistor 43, and comparing the monitored tip lead voltage with a predetermined DC voltage denoted as OFFSET, via resistor 45.

Capacitor 38 is connected to the output and inverting input of amplifier 17, and capacitor 40 is connected to the non-inverting input and ground, for filtering out AC signals, such as audio, and thereby facilitate DC current control.

Amplifier 17 generates a DC bias level signal proportional to the difference in voltage between the monitored line voltage at $T_c$ and the external OFFSET voltage. The DC bias signal is applied equally to inverting and non-inverting inputs of ring and tip driver circuits 7 and 5 via equal valued resistors 47 and 49, respectively, such that a negative feedback path is established for maintaining the DC voltages on the tip and ring leads at the predetermined bias level (controlled by the OFFSET signal), relative to the nominal line voltages of 0 volts DC and −48 volts DC, respectively.

For example, disregarding the effect of amplifier 18 which introduces a common mode signal to amplifier 17, in the event the OFFSET voltage is set at zero volts, the voltage at the node connecting resistors 37, 41, 45 and 46 is forced to zero volts. Due to negative feedback of the voltage appearing on the tip at the Tc terminal, the voltage at the node connecting resistors 35, 39, 43 and 44 is also forced to zero volts. In other words, the current flowing from the +5 volt source through resistors 44 and 43 towards the −2 volt sink provided by the $T_c$ terminal, results in ground potential appearing at the node connecting resistors 35, 39, 43 and 44.

Accordingly, the negative feedback path established by amplifier 17 provides DC signal biasing for maintaining the DC line voltage levels on the tip and ring leads at −2 volts DC and −46 volts DC, respectively, in the manner of a constant voltage source.

In the event of excess current being drawn by the tip and ring leads, due to a short line loop length, etc., current limiting is provided for reducing the total metallic current drawn by the tip and ring leads to a predetermined level.

In particular, amplifier 18 has inverting and non-inverting inputs connected across line feed resistors 13 and 15 at terminals $T_c$, $T_f$, $R_c$ and $R_f$ via equal valued input resistors 51, 53, 55 and 57. A feedback resistor 52 is connected from an output of amplifier 18 to an inverting input thereof in a well known manner. Amplifier 18 senses the metallic current drawn in the tip and ring leads by summing the currents flowing through line feed resistors 13 and 15, rejecting common mode currents, and in response generating a further DC output voltage signal inversely proportional thereto.

A predetermined DC threshold voltage $V_{SET}$ (eg. −0.8 volts), is applied to the inverting input of amplifier 17 via a diode 59 and input resistor 35 such that in the event the voltage output from amplifier 18 is sufficient to maintain the voltage on the node connecting resistors 37 and 41, and 35 and 39 at approximately 0 volts, diode 59 remains reverse-biased, and the further DC voltage is applied equally to the inverting and non-inverting inputs of amplifier 17 via resistors 41 and 37, 39 and 35, so as to be effectively cancelled.

However, in the event that the metallic current increases beyond a predetermined threshold, such that the voltage at the node connecting resistors 35 and 39 drops below a predetermined voltage equal to the sum of $V_{SET}$ minus the forward voltage drop across diode 59, the inverting input of amplifier 17 is maintained at approximately the aforementioned predetermined voltage, and the voltage output from amplifier 18 is applied only to the non-inverting input of amplifier 17, so as to be differentially received and amplified therein.

Accordingly, amplifier 17 ceases monitoring only the tip voltage carried by the terminal $T_c$, and the DC bias signal output from amplifier 17 is adjusted in relation to the detected metallic current, for limiting the metallic current drawn by the tip and ring leads to a predetermined level (eg. 30 millamps) as set by the threshold voltage $V_{SET}$. In particular, the DC bias voltage is adjusted such that the voltage difference between the line voltages on the tip and ring leads is reduced, thereby maintaining the metallic current at the aforementioned predetermined level (eg. 30 millamps).

Thus, when drawing nominal current, the control circuit of FIG. 1 provides negative feedback of the line voltage carried by the $T_c$ terminal, for maintaining the voltages on the tip and ring leads at predetermined offset bias voltages from their nominal levels. Upon detection of a metallic current in excess of a predetermined threshold level established by $V_{SET}$, diode 59 turns on, effectively clamping the voltage on the inverting input of amplifier 17 at X volts, such that the DC bias signal output therefrom is adjusted in response to the metallic current detected via amplifier 18, thereby maintaining the current at a predetermined level.

According to a successful prototype of the invention resistors 43 and 46 were each 200 k ohms, resistors 41 and 39 were each 42 k ohms, resistors 37 and 35 were each 150 k ohms, and resistors 44 and 45 were each 500 k ohms.

A comparator 80 has an inverting input connected to the output of differential amplifier 18 and a non-inverting input connected to a source of threshold voltage (i.e. −5 volts). As discussed above, differential amplifier 18 detects the flow of metallic current in the tip and ring leads. The signal output from amplifier 18 is monitor in comparator 80 and compared with the threshold voltage for detecting changes in line impedance of the tip and ring leads.

Thus, in the event of a sudden impedance increase in a remote load (i.e. a central office trunk circuit) connected to the tip and ring leads, decreased metallic current flows in the telephone line. The decreased metallic current flow is detected in differential amplifier 18, causing the comparator 80 to generate a control signal designated SHORT.

The SHORT signal output from comparator 80 is applied via a differentiating capacitor 86 to the base input of a PNP transistor 88 having a collector terminal thereof connected via pull up resistor 90 to a source of −28 volts DC, and an emitter terminal connected to the base terminal via resistor 92 and to one terminal of the aforementioned integrating capacitor 38 connected between the output of amplifier 17 and the inverting input thereof.

In the event of sudden changes in the flow of metallic current as a result of sudden impedance changes in the tip and ring lead (due, for example, to the remote trunk circuit switching from a battery and ground feed to loop feed, as discussed above), the change in the output signal from comparator 80 is differentiated via capacitor 86 causing a momentary enabling pulse to be applied to the base of PNP transistor 88. In response, transistor 88 is momentarily enabled, thereby discharging integrating capacitor 38 via the source of discharging potential −28 volts DC through resistor 90.

Thus, amplifier 17 quickly compensates for the change in line impedance, whereas in prior art systems the line circuit would have operated in a reduced current mode due to the settling time of integrating capacitor 38.

In summary, according to the present invention, a compensation circuit is provided for use with an integrating amplifier useful in a DC control circuit of a constant current line circuit. The compensation circuit detects sudden variations or changes in the input signal applied to the integrating amplifier, and in response discharges the integrating capacitor thereby increasing responsiveness of the integrating amplifier in the event of such sudden changes or variations in the input signal.

A person understanding the present invention may conceive of further embodiments or variations thereof.

For example, while the compensation circuit of the present invention has been described with reference to a particular application for increasing responsiveness of an integrating amplifier used in the DC control circuit of a constant current line circuit, the compensation circuit may be used for other applications as well.

All such embodiments and variations are believed to be within the sphere and scope of the present invention as defined by the claims appended thereto.

I claim:

1. In a constant current line circuit including tip and ring lead differential driver circuits for generating nominal tip and ring lead battery voltages, and a DC control circuit comprised of amplifier means and integrating capacitor means connected thereacross for monitoring DC voltages carried by said tip and ring leads and in response maintaining DC current flowing in said tip and ring leads at a constant level; the improvement comprising compensation means for detecting a sudden increase in impedance connected to said tip and ring leads and in response momentarily discharging said integrating capacitor mean, thereby increasing responsiveness of said DC control circuit in the event of said sudden increase in impedance connected to said tip and ring leads.

2. Compensation means as defined in claim 1, further comprised of differential amplifier means for detecting metallic current flowing in said tip and ring leads, and in response to detection of a sudden decrease in said metallic current flow generating an enable signal; and switch means connected to said differential amplifier means and said integrating capacitor means for receiving said enable signal and in response connecting one terminal of said capacitor means to a source of DC voltage for discharging said capacitor means.

3. Compensation means as defined in claim 1, further comprised of:
    (a) a first differential amplifier for detecting metallic current flowing in said tip and ring leads and generating a first DC output signal in response thereto,
    (b) a second differential amplifier for receiving and comparing said DC output signal with a predetermined threshold signal and generating a further DC output signal in the event said first DC output signal is in excess of a predetermined threshold level, and
    (c) transistor switch means having a control input thereof connected via a high pass filtering capacitor to an output of said second differential amplifier, a switching path of said transistor switch means being connected to one terminal of said capacitor means and to a source of DC discharge potential, whereby said transistor switch means connects said one terminal of said capacitor means to said source of DC discharge potential via said switching path in response to receiving said further DC output signal on the control input thereof.

4. In a constant current line circuit including tip and ring lead differential driver circuits for generating nominal tip and ring lead battery voltages, and a DC control circuit comprised of amplifier means and integrating capacitor means connected thereacross for monitoring DC voltages carried by said tip lead and in response generating a predetermined DC bias signal to each of said tip and ring lead driver circuits for maintaining constant DC current flow through said tip and ring leads; a method for increasing responsiveness of said DC control circuit in the event of a sudden increase in impedance connected to said tip and ring leads, comprising the steps of detecting decreased current flow in said tip and ring leads, and in response momentarily discharging said integrating capacitor means.

5. For use with an integrating amplifier having an integrating capacitor connected between an input and output thereof for monitoring an input signal and generating an integrated output signal in response thereto: compensation means for detecting sudden variations in said input signal and in response momentarily discharging said integrating capacitor, thereby increasing responsiveness of said integrating amplifier in the event of said sudden input signal variations, wherein said compensation means is comprised of:
    (a) a comparator for monitoring said input signal and generating one of two possible output enable signals in the event that the amplitude of said input signal is greater than or less than a predetermined threshold level, respectively, (b) a differentiating capacitor connected to said comparator, for receiving said one of two possible enable signals and generating a momentary enabling pulse in response thereto, and
(c) a switching circuit connected between said integrating capacitor and a source of discharge potential, a control input of said switching circuit being connected to said differentiating capacitor for receiving said momentary enabling pulse and in response momentarily connecting said integrating capacitor to said source of discharge potential.

* * * * *